(No Model.)
M. F. McCRAY.
CULTIVATOR.
No. 318,922. Patented May 26, 1885.
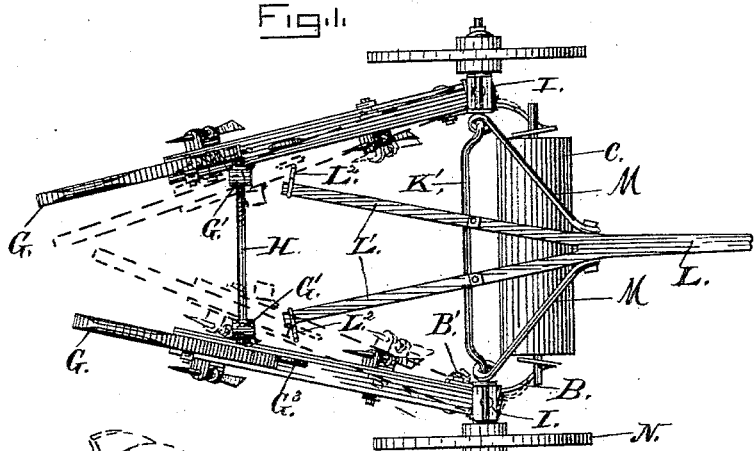
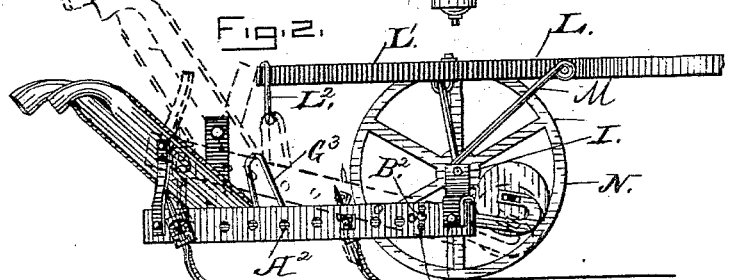
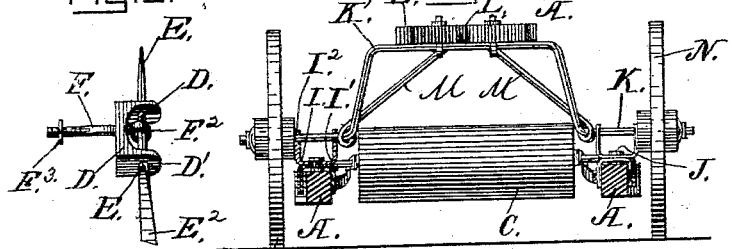 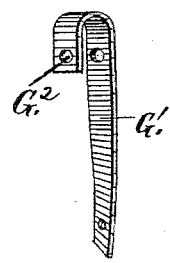
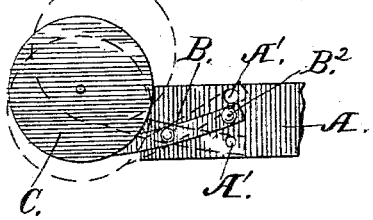
WITNESSES
R. W. Bishop
P. B. Turpin
INVENTOR
Millard F. McCray
By R. S. & A. P. Lacey
ATTYS

UNITED STATES PATENT OFFICE.

MILLARD F. McCRAY, OF GLASSVILLE, MISSOURI.

CULTIVATOR.

SPECIFICATION forming part of Letters Patent No. 318,922, dated May 26, 1885.

Application filed February 7, 1885. (No model.)

*To all whom it may concern:*

Be it known that I, MILLARD F. MCCRAY, a citizen of the United States, residing at Glassville, in the county of Caldwell and State of Missouri, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention is an improvement in combined cultivators, harrows, and rollers; and it consists in certain novel constructions and combinations of parts, which will be first fully described, and then pointed out in the claims.

In the drawings, Figure 1 is a plan, Fig. 2 a side view, and Fig. 3 a sectional view, of my machine. Fig. 4 is a detail view illustrating the manner of supporting the roller. Fig. 5 is a detail view of the combined tooth and its clamping devices, and Fig. 6 is a detail view of one of the uprights.

The beams A A are provided with teeth, presently described, and have fixed by pivot B' near their forward ends the roller-supporting bars B. These bars extend forward from the beam, and have the trunnions of the roller C journaled in them near their forward ends, and they extend rearwardly from their pivots B', and are secured at their rear ends by a bolt, B², placed through one of a vertical series of holes, A', in the beam A. By this construction the roller may be adjusted to different heights, as will be understood most clearly from Fig. 4.

The beams A are also provided with transverse bolt-holes A², through which are passed the bolts for securing the teeth in place. In order to firmly secure the teeth, I employ a block, D, having at its opposite ends lateral lugs D', suitably perforated to permit the passage of the tooth E. This tooth E is formed on one end, E', to act as a harrow-tooth, and on its opposite end E², to operate as a cultivator-tooth, as is clearly shown in Fig. 5.

The clamping-bolt F is provided on one end with an eye, F², through which the tooth is passed.

In the application of the parts the block D is placed alongside the beam, on the inner or outer side of same. The bolt F is then passed through the block D and the beam, its eye F² resting between the lugs B' and the block D. The tooth E is then inserted through one lug D', thence through the eye F², and continuing on through the opposite lug D', when by tightening the nut F³ on the bolt F the clamp-block D and the tooth E may be secured firmly to the beam with end E' or E² of the tooth in operative position and the said tooth at any suitable angle desired.

By this construction it will be noticed by loosening the nut F³ the tooth may be readily turned end for end in order to convert the machine from a cultivator into a harrow, or vice versa.

Each of the beams A is provided near its rear end with handles G, and they have mounted on them also near their rear ends uprights G', having near their upper ends openings G² for the passage of the bolt H, by which the said uprights and through them the beams may be secured together. The beams are also provided with loops or links G³ for the purpose presently described.

Upon the forward ends of the beams A are secured the boxes I, formed of base-plate I' and side lugs, I², formed with openings, which serve as bearings for the axle. The boxes are secured to the beams by a bolt, J, passed through their base-plate I', forming a pivot, by which the rear end of said beams may be adjusted together or apart without disturbing the bearings of the axle.

In the boxes I are journaled the axles K, which are preferably formed on the ends of an arch, K'. This arch supports the tongue L, which extends rearwardly beyond the arch and has its ends branched at L'. At or near the end of each branch L', I secure one end of the depending hook L², which is adapted to engage the loops G³ and elevate the beam when so desired.

The arch and the tongue are strengthened in their connection by a brace, M, attached at one end to the tongue and at the other end to the arch at the junction of the axles K therewith.

In carrying out my invention I prefer to use eight or ten of the teeth on each beam A, and it will be seen that I have provided the beams with a number of holes greater than the number of teeth shown. The number of teeth, however, may be varied to suit the circumstances or wishes of each user.

When it is desired to use my machine as a combined clod-crusher and harrow, the wheels N, which are supported on the axles K, may be removed. In such case the roller C is lowered from the position shown in Fig. 2, and the teeth are adjusted to bring their harrow-points downward, and the said points are inclined rearwardly to suit the ground being worked.

In transporting the machine from place to place on the farm the hooks $L^2$ may serve to support the loops $G^3$, and so hold the beams and teeth clear of the ground, as shown in dotted lines, Fig. 2.

Having thus described my invention, what I claim, and desire to secure by Letters Patent, is—

1. The combination of the axle, the boxes supported on such axle, and the beams connected by a vertical pivot with said boxes, whereby they may be adjusted in a horizontal plane, substantially as set forth.

2. The combination of the beam, the block D, having lugs D', the bolt F, having eye $F^2$ and passed through block F, and the beam with its eye $F^2$ between the lugs D', and the tooth passed through one of lugs D', thence through eye $F^2$ and the other lug D', substantially as and for the purposes specified.

3. The combination of the beams, the teeth secured thereto, the arch having axles K, the boxes adapted to support the beams and pivoted to the axles, the bars B, projected forward from the beams, and the roller supported by said beams, substantially as set forth.

In testimony whereof I affix my signature in presence of two witnesses.

MILLARD F. McCRAY.

Witnesses:
DENNIS W. DAVIS,
SAMUEL BLISS.